(12) United States Patent
Park et al.

(10) Patent No.: US 12,155,097 B2
(45) Date of Patent: Nov. 26, 2024

(54) EJECTOR NOZZLE AND EJECTOR INCLUDING SAME

(71) Applicants:Hyundai Motor Company, Seoul (KR); Kia Corporation, Seoul (KR)

(72) Inventors: In Tae Park, Gyeonggi-do (KR); Hak Yoon Kim, Incheon (KR); Hyeon Seok Ban, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/378,320

(22) Filed: Oct. 10, 2023

(65) Prior Publication Data

US 2024/0055623 A1    Feb. 15, 2024

Related U.S. Application Data

(62) Division of application No. 16/984,507, filed on Aug. 4, 2020, now Pat. No. 11,824,235.

(30) Foreign Application Priority Data

Dec. 16, 2019    (KR) .................. 10-2019-0167676

(51) Int. Cl.
   *F02C 3/32*     (2006.01)
   *F04F 5/16*     (2006.01)
   (Continued)

(52) U.S. Cl.
   CPC ........... *H01M 8/04097* (2013.01); *F02C 3/32* (2013.01); *F04F 5/16* (2013.01); *F04F 5/461* (2013.01); *H01M 8/04753* (2013.01)

(58) Field of Classification Search
   CPC ...... F02C 3/32; F02C 3/34; F02C 6/08; F02C 6/18
   See application file for complete search history.

(56) References Cited

U.S. PATENT DOCUMENTS 5,182,905 A       2/1993  Stransky et al.
6,138,456 A  *  10/2000  Garris .................... F04F 5/466
                                                               417/178
(Continued)

FOREIGN PATENT DOCUMENTS

CN        1673620 A      9/2005
CN      101532513 A      9/2009
(Continued)

OTHER PUBLICATIONS

Mao, C. et al., "Investigation of the flow field for a double-outlet nozzle during minimum quantity lubrication grinding", Int. J. Adv. Manuf. Technol. (2016) 85:291-298.

(Continued)

*Primary Examiner* — Thuyhang N Nguyen
(74) *Attorney, Agent, or Firm* — Fox Rothschild LLP

(57) ABSTRACT

The present disclosure provides an ejector nozzle and an ejector including the same. The ejector nozzle includes a first tube having a first flow path into which a fluid is introduced, and a second tube provided outside the first tube and having an inner diameter larger than an inner diameter of the first tube, the second tube defining a second flow path between the first tube and the second tube, in which the first tube further includes a communication port that penetrates the first tube to allow the first flow path to communicate with the second flow path and is openably and closable provided, and in which when the communication port is opened, a part of the fluid flowing in the first flow path is allowed to flow along the second flow path.

1 Claim, 4 Drawing Sheets

(51) Int. Cl.
*F04F 5/46* (2006.01)
*H01M 8/04089* (2016.01)
*H01M 8/04746* (2016.01)

(56) References Cited

U.S. PATENT DOCUMENTS

| | | | |
|---|---|---|---|
| 7,037,609 B2 | 5/2006 | Sugawara et al. | |
| 8,006,923 B2 | 8/2011 | Stoops | |
| 8,074,897 B2 | 12/2011 | Hunnicutt et al. | |
| 8,313,044 B2 | 11/2012 | Stoops | |
| 8,789,768 B2 | 7/2014 | Hunnicutt et al. | |
| 9,214,684 B2 | 12/2015 | Kwon et al. | |
| 9,368,806 B2 | 6/2016 | Noh et al. | |
| 9,399,950 B2 * | 7/2016 | Mittricker | F23C 9/00 |
| 9,598,990 B2 | 3/2017 | Doko et al. | |
| 10,315,421 B2 | 6/2019 | Menzel et al. | |
| 11,001,059 B2 | 5/2021 | Menzel et al. | |
| 2005/0211142 A1 | 9/2005 | Yamamoto et al. | |
| 2009/0152373 A1 | 6/2009 | Stoops | |
| 2010/0090024 A1 | 4/2010 | Hunnicutt et al. | |
| 2011/0278377 A1 | 11/2011 | Stoops | |
| 2012/0061489 A1 | 3/2012 | Hunnicutt et al. | |
| 2012/0141891 A1 * | 6/2012 | Kwon | H01M 8/04097 429/415 |
| 2015/0333339 A1 | 11/2015 | Noh et al. | |
| 2017/0190179 A1 | 7/2017 | Menzel et al. | |
| 2019/0248138 A1 | 8/2019 | Menzel et al. | |
| 2019/0348696 A1 | 11/2019 | Meder | |
| 2021/0091393 A1 * | 3/2021 | Gruenberger | F04B 49/22 |
| 2021/0245508 A1 | 8/2021 | Menzel et al. | |

FOREIGN PATENT DOCUMENTS

| | | |
|---|---|---|
| CN | 101716561 A | 6/2010 |
| CN | 101939059 A | 1/2011 |
| CN | 103981512 A | 8/2014 |
| CN | 105098209 A | 11/2015 |
| CN | 108698405 A | 10/2018 |
| CN | 109630479 A | 4/2019 |
| CN | 110462904 A | 11/2019 |
| GB | 786842 A | 11/1957 |
| KR | 10-2012-0061196 A | 6/2012 |
| KR | 10-2014-0046168 A | 4/2014 |

OTHER PUBLICATIONS

Zheng, Z. et al., "Numerical Simulation of Flow Field in a New Coaxial Air-injected Atomizer", College of Chemical Engineering, China University of Petroleum, Qingdao 266555, China, vol. 44 No. 5 (2015), 4 pages.

Notification of First Office Action from China National Intellectual Property Adminstration for Application No. 2020108245337, dated Sep. 4, 2023, 15 pages, with English translation.

* cited by examiner

EJECTOR NOZZLE AND EJECTOR INCLUDING SAME

CROSS-REFERENCES TO RELATED APPLICATIONS

This Application is a Division of application Ser. No. 16/984,507 filed on Aug. 4, 2020. Application Ser. No. 16/984,507 claims the benefit of Korean Patent Application No. 10-2019-0167676 filed on Dec. 16, 2019 in the Korean Intellectual Property Office (KIPO), the entire contents of which are incorporated herein by reference in their entirety.

TECHNICAL FIELD

The present disclosure relates to an ejector nozzle and an ejector including the same, and more particularly, to an ejector nozzle, which satisfies both a low-flow rate region and a high-flow rate region, and an ejector including the same.

BACKGROUND ART

A diameter of a nozzle is considered as an important factor in a system that moves a fluid by using an ejector.

If the nozzle has a large size, it is easy to implement a desired performance in a high-flow rate section, but a flow velocity is decreased, and a performance of the ejector deteriorates in a low-flow rate section. In contrast, if the nozzle has a small size, a high flow velocity may be generated in the low-flow rate section, but the nozzle is difficult to utilize in the high-flow rate section because it is difficult to allow a large amount of fluid in the high-flow rate section to pass through the nozzle.

Accordingly, there is a need for an ejector having a nozzle capable of dealing with various flow rates.

SUMMARY OF THE INVENTION

The present disclosure has been made in an effort to provide an ejector nozzle, which satisfies both a low-flow rate region and a high-flow rate region by changing a size of an entire flow path of the ejector nozzle based on a flow rate of a supplied fluid, and an ejector including the same.

The present disclosure has also been made in an effort to provide an ejector nozzle, which may reduce costs, implement high efficiency with a compact structure, and thus improve reliability in respect to products and performances, and an ejector including the same.

An exemplary embodiment of the present disclosure provides an ejector nozzle including a first tube having a first flow path into which a fluid is introduced, and a second tube provided outside the first tube and having an inner diameter larger than an inner diameter of the first tube, the second tube defining a second flow path between the first tube and the second tube, in which the first tube further includes a communication port that penetrates the first tube to allow the first flow path to communicate with the second flow path and is operably and closably provided, and in which when the communication port is opened, a part of the fluid flowing in the first flow path is allowed to flow along the second flow path.

Another exemplary embodiment the present disclosure provides an ejector including an ejector nozzle, the ejector including an ejector body including a first inlet part into which a supply gas supplied from a hydrogen storage tank is introduced, and a second inlet part into which a recirculation gas, which is discharged from a fuel cell stack and recirculates to the fuel cell stack, is introduced, and an ejector nozzle provided in the ejector body and configured to eject the supply gas introduced into the first inlet part to circulate the recirculation gas, in which the ejector nozzle includes a first tube having a first flow path into which the supply gas is introduced, and a second tube provided outside the first tube and having an inner diameter larger than an inner diameter of the first tube, the second tube defining a second flow path between the first tube and the second tube, in which the first tube further includes a communication port that penetrates the first tube to allow the first flow path to communicate with the second flow path and is openably and closably provided, and in which when the communication port is opened, a part of the supply gas flowing in the first flow path is allowed to flow along the second flow path.

DETAILED DESCRIPTION

Hereinafter, exemplary embodiments of the present disclosure will be described below in detail with reference to the accompanying drawings.

First, the exemplary embodiments described below are exemplary embodiments suitable for understanding technical features of an ejector nozzle and an ejector including the same according to the present disclosure. However, the present disclosure is not limitedly applied to the exemplary embodiments described below, the technical features of the present disclosure are not limited by the exemplary embodiment described herein, and various modifications can be implemented within the technical scope of the present disclosure.

Figure 1:
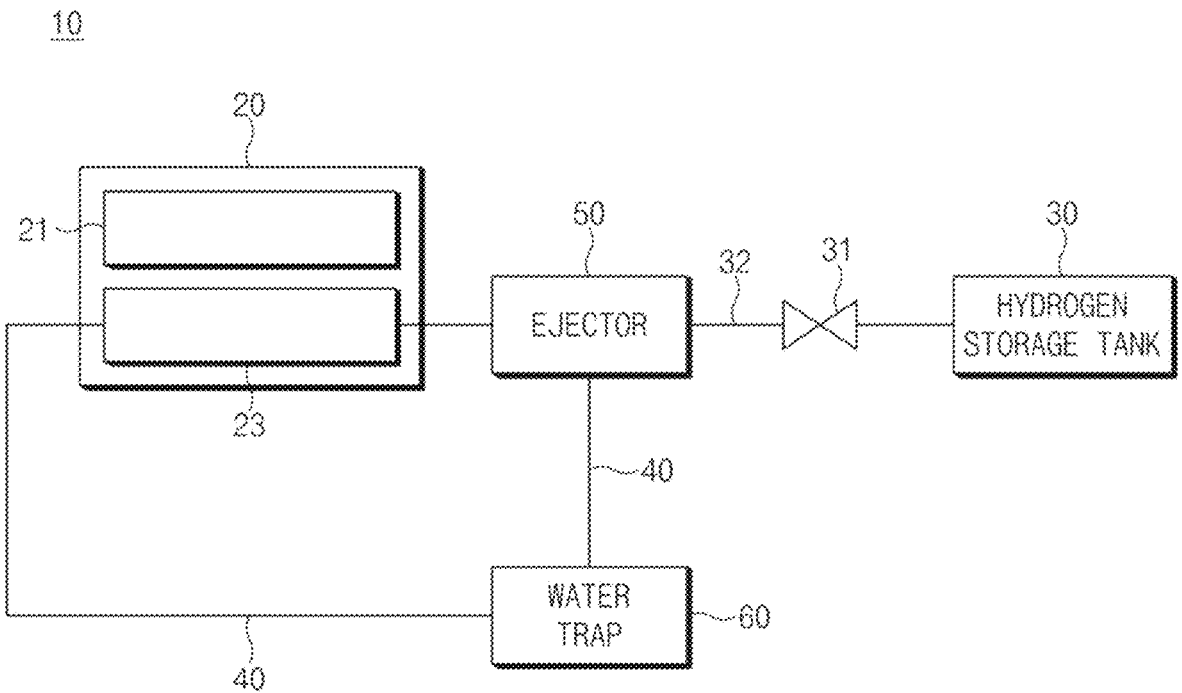
FIG. 1 is a view illustrating an example of a fuel cell system to which the present disclosure is applied.

An ejector 50 including an ejector nozzle 100 according to the present disclosure may be applied to a fuel cell system. FIG. 1 illustrates an example of a fuel cell system.

Referring to FIG. 1, a fuel cell system 10 according to the present disclosure includes a fuel cell stack 20, a compressor (not illustrated) configured to compress air and supply the compressed air to the fuel cell stack 20, and a hydrogen storage tank 30 configured to supply hydrogen to the fuel cell stack 20. The air compressed by the compressor may be supplied to an air electrode 21 of the fuel cell stack 20 along an air supply line. The hydrogen stored in the hydrogen storage tank 30 may be supplied to a fuel electrode 23 of the fuel cell stack 20 along a hydrogen supply line 32. A hydrogen supply valve 31 configured to control the supply of the hydrogen may be provided in the hydrogen supply line 32.

The fuel cell stack 20 may have various structures capable of producing electricity by means of an oxidation-reduction reaction between fuel (e.g., hydrogen) and an oxidant (e.g., air). The present disclosure is not restricted or limited by the structure of the fuel cell stack 20.

The fuel cell system 10 includes a recirculation line 40 through which the gas (hydrogen) discharged from the fuel cell stack 20 recirculates to the fuel cell stack 20. For convenience of description, the hydrogen, which is gas that circulates to the fuel cell stack through the recirculation line 40, is referred to as a recirculation gas, and the hydrogen, which is gas supplied from the hydrogen storage tank to the fuel cell stack 20, is referred to as a supply gas. The recirculation gas and the supply gas may be hydrogen.

A water trap 60 may be provided in the recirculation line 40 to remove condensate water contained in the hydrogen which is the gas that recirculates to the fuel cell stack 20. The ejector 50 may be provided in the recirculation line 40 to supply the supply gas and the recirculation gas, FIG. 2 illustrates the ejector 50 including the ejector nozzle 100 according to the present disclosure.

Figure 2:
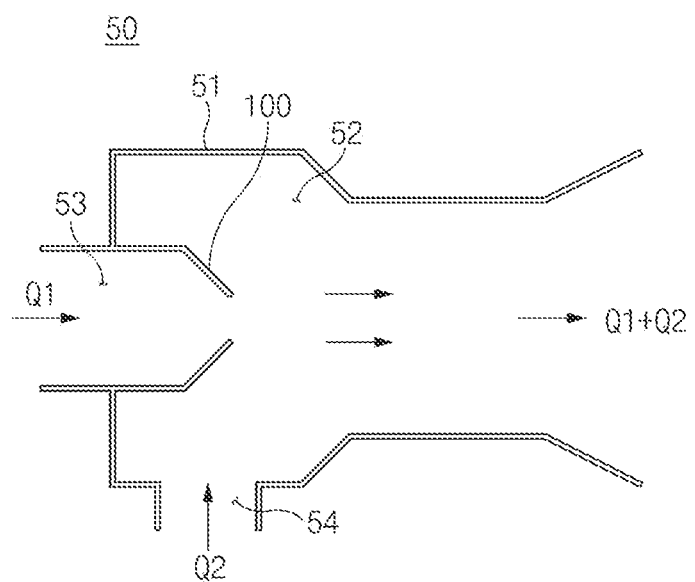
FIG. 2 is a cross-sectional view schematically illustrating an ejector according to the present disclosure.

Referring to FIG. 2, the ejector 50 including the ejector nozzle 100 according to the present disclosure includes an ejector body 51 and the ejector nozzle 100.

The ejector body 51 includes a first inlet part 53 into which the supply gas Q1 supplied from the hydrogen storage tank 30 is introduced, and a second inlet part 54 into which the recirculation gas Q2, which is discharged from the fuel cell stack 20 and recirculates to the fuel cell stack 20, is introduced. In addition, the ejector body 51 may include a chamber 52 in which a mixture (Q1+Q2) of the supply gas Q1 and the recirculation gas Q2, which are introduced from the first inlet part 53 and the second inlet part 54, respectively, flows.

The ejector nozzle 100 may be provided in the ejector body 51 and may eject the supply gas Q1 introduced into the first inlet part 53 to circulate the recirculation Izas Q2.

Specifically, the ejector 50 allows the high-pressure supply gas Q1, which is supplied from the hydrogen storage tank 30, to flow at a high velocity through the ejector nozzle 100, and as a result, the low-pressure recirculation gas Q2 may be drawn and flow to the fuel cell stack 20. That is, the ejector 50 may act as a kind of pump that ejects the supply gas Q1 from the ejector nozzle 100 and draws the recirculation gas Q2.

Figure 3:
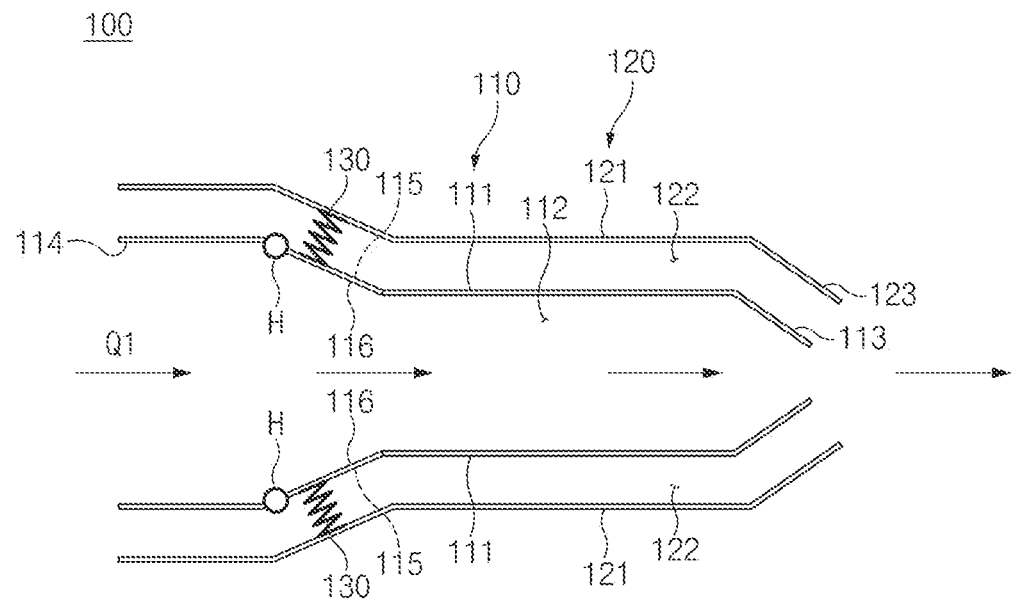
FIG. 3 is a cross-sectional view illustrating an ejector nozzle according to the present disclosure.
Figure 4:
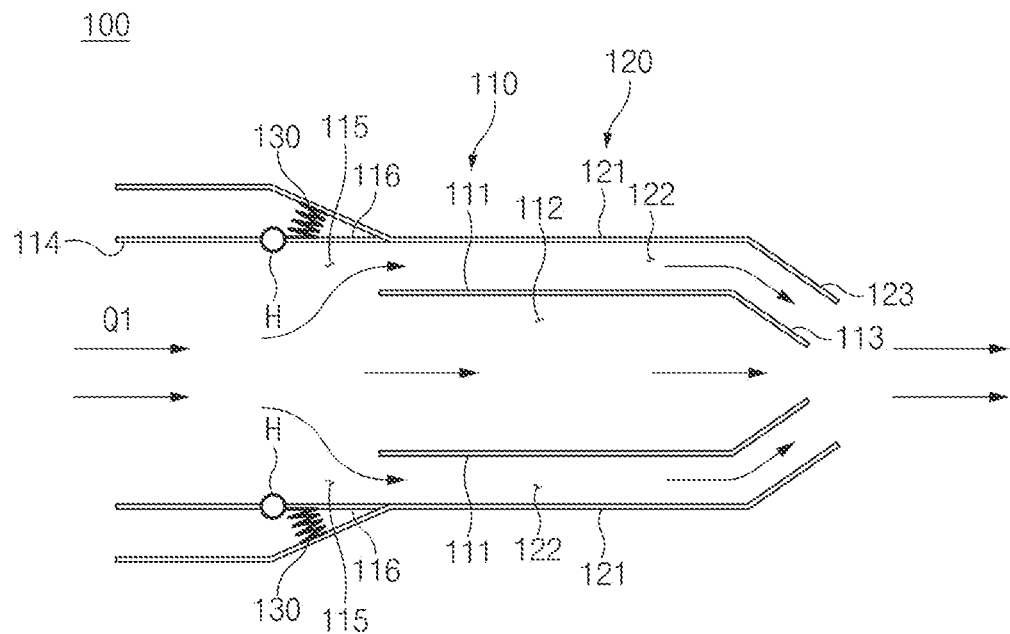
FIG. 4 is a cross-sectional view illustrating a state in which a communication port of the ejector nozzle illustrated in FIG. 3 is opened.

FIGS. 3 and 4 illustrate the ejector nozzle 100 according to the present disclosure.

Referring to FIGS. 3 and 4, the ejector nozzle 100 may be provided in the form of a dual tube including a first tube 110 and a second tube 120. The first tube 110 includes a first flow path 112 into which the fluid is introduced. The second tube 120 is provided outside the first tube 110, has an inner diameter larger than an inner diameter of the first tube 110, and defines a second flow path 122 between the first tube 110 and the second tube 120.

The fluid Q1 introduced into the ejector nozzle 100 to be described below may be the supply gas Q1 to be supplied to the fuel cell stack 20 as described above. However, the ejector nozzle 100 according to the present disclosure is not limited as being used for the ejector 50 provided in the fuel cell system 10, but the ejector nozzle 100 may be applied to the ejectors 50 used in various fields. Further, the fluid introduced into the ejector nozzle 100 is not limited to the supply gas Q1 to be supplied to the fuel cell stack 20.

The first tube 110 and the second tube 120 may be provided as hollow tubes having different sizes. The first flow path 112 may be formed in the first tube 110, and the second flow path 122 may be positioned between an outer surface of the first tube 110 and an inner surface of the second tube 120. The fluid may be introduced through an inlet port 114 of the first tube 110, flow along the first flow path 112, and then be ejected.

The first tube 110 further includes a communication port 115 openably and closably provided and penetratively formed to allow the first flow path 112 to communicate with the second flow path 122. When the communication port 115 is opened, a part of the fluid flowing through the first flow path 112 is allowed to flow along the second flow path 122.

Specifically, the communication port 115 may be selectively opened, such that a part of the fluid introduced into the first flow path 112 may flow to the second flow path 122. The fluid introduced into the first tube 110 may flow only along the first flow path 112 when the communication port 115 is closed, and the fluid introduced into the first tube 110 may flow along both the first flow path 112 and the second flow path 122 when the communication port 115 is opened.

Therefore, it is possible to obtain an effect of changing a diameter of an entire flow path that constitutes the nozzle. For example, it is possible to change the diameter of the entire flow path of the ejector nozzle 100 by opening or closing the communication port 115 based on a flow rate of the fluid introduced into the ejector nozzle 100. Therefore, it is possible to provide a structure that satisfies both a low-flow rate region and a high-flow rate region by changing a size of the entire flow path of the ejector nozzle 100 based on the flow rate of the fluid to be supplied.

Specifically, when the fluid is introduced at a low flow rate, the communication port 115 is closed such that the fluid may flow only to the first flow path 112. Therefore, the fluid may be discharged to the outside of the nozzle at a high flow velocity even though the flow rate is low.

When the fluid is introduced at a high flow rate, the communication port 115 is opened such that the fluid may flow along both the first flow path 112 and the second flow path 122. Therefore, the size of the entire flow path through which the fluid passes is increased, such that the fluid may be allowed to pass at a high flow rate.

Referring to FIGS. 3 and 4, the present disclosure may further include opening/closing members 116 and elastic members 130. The opening/closing member 116 may be provided in the first tube 110 in order to open or close the communication port 115.

The elastic member 130 may be provided between the first tube 110 and the second tube 120 and may provide elastic force that allows the opening/closing member 116 to open or close the communication port 115 based on the flow rate of the fluid introduced into the first flow path 112. In this case, the elastic member 130 may be configured as, but not limited to, an elastic spring.

As described above, the present disclosure may allow the opening/closing member 116 to perform the opening or closing operation, without a separate control means, by using the elastic member 130 that elastically operates based on a pressure in the nozzle which is determined in accordance with a flow rate. Therefore, the present disclosure may reduce costs and implement high efficiency with a compact structure, thereby improving reliability in respect to products and performances.

More specifically, the first tube 110 may further include a first body part 111 and a first discharge port 113.

The communication port 115 may penetrate the first body part 111, and the first flow path 112 may be formed in the first body part 111. The first discharge port 113 may be provided at one side tip of the first body part 111 so that the fluid is discharged from the first discharge port 113.

The second tube 120 may include a second body part 121 having the second flow path 122, and a second discharge port 123 provided at one side tip of the second body so that the fluid is discharged front the second discharge port 123. In this case, a diameter of the second discharge port 123 may be larger than a diameter of the first discharge port 113.

Therefore, a diameter of an entire discharge port, from which the fluid is discharged, may also be changed as the communication port 115 is opened or closed.

The opening/closing member 116 may be hingedly coupled to the first body part 111 so as to be able to open or close the communication port 115. Specifically, the communication port 115 may penetrate a part of the first body part 111 and may be formed in the form of a hole as an example. However, the shape of the communication port 115 is not limited thereto, but the communication port 115 may be variously modified to have various shapes as long as the communication port 115 may allow the first flow path 112 and the second flow path 122 to communicate with each other.

The opening/closing member 116 may have various shapes as long as the opening/closing member 116 may close or open the communication port 115. For example, the opening/closing member 116 may be connected to the first body part 111 by means of a hinge H so that one end of the opening/closing member 116 is disposed adjacent to tie communication port 115. Further, the opening/closing member 116 may be provided to be rotatable in a direction toward the second tube 120 about the portion connected by means of the hinge H. In addition, in the state in which the opening/closing member 116 closes the communication port 115, the rotation of the opening/closing member 116 in the direction toward the first flow path 112 may be restricted.

The elastic member 130 may provide elastic force to the opening/closing member 116. For example, one end of the elastic member 130 may be fixed to the inner surface of the second tube 120, and the other end of the elastic member 130 may be fixed to the opening/closing member 116 in the first tube 110.

When a flow rate of the fluid introduced into the first flow path 112 is within a reference range, the elastic member 130 elastically supports the opening/closing member 116 to allow the opening/closing member 116 to close the communication port 115. In contrast, when a flow rate of the fluid introduced into the first flow path 112 exceeds the reference range, the elastic member 130 is elastically deformed by a pressure of the introduced fluid to allow the opening/closing member 116 to open the communication port 115.

Specifically, when a flow rate of the introduced fluid is within the reference range (a low flow rate, see FIG. 3), elastic supporting force of the elastic member 130 may allow the opening/closing member 116 to maintain a state in which the communication port 115 is closed. In this case, the fluid introduced into the first tube 110 may flow only through the first flow path 112 and then be ejected from the first discharge port 113. Therefore, the fluid may be discharged at a high flow velocity even though the flow rate is low.

When a flow rate of the introduced fluid exceeds the reference range (a high flow rate, see FIG. 4), a pressure of the introduced fluid overcomes the elastic force of the elastic member 130, such that the opening/closing member 116 may open the communication port 115 while rotating in the direction toward the second tube 120. In this case, the elastic member 130 may be compressed and deformed. When the communication port 115 is opened, the first flow path 112 and the second flow path 122 communicate with each other, such that a part of the fluid flowing to the first flow path 112 may be introduced into the second flow path 122, and the fluid may be discharged through the first discharge port 113 and the second discharge port 123.

Thereafter, when a flow rate of the introduced fluid is decreased again to be within the reference range, the opening/closing member 116 may close the communication port 115 while being rotated in the direction toward the first flow path 112 by elastic restoring force of the elastic member 130. As described above, the present disclosure may deal with various flow rates.

According to the present disclosure, the diameter of the entire flow path in the ejector nozzle may be changed depending on the flow rate of the fluid introduced into the ejector nozzle. Therefore, it is possible to provide the structure that satisfies both the low-flow rate region and the high-flow rate region by changing the size of the entire flow path of the ejector nozzle based on the flow rate of the fluid to be supplied.

In addition, the present disclosure may allow the opening/closing member to perform the opening or closing operation, without a separate control means, by using the elastic member that elastically operates based on the pressure in the nozzle which is determined in accordance with the flow rate. Therefore, the present disclosure may reduce costs and implement high efficiency with a compact structure, thereby improving reliability in respect to products and performances.

While the specific exemplary embodiments of the present disclosure have been described above, the spirit and scope of the present disclosure are not limited to the specific exemplary embodiments, and those skilled in the art to which the present disclosure pertains may variously modify and change the present disclosure without departing from the subject matter of the present disclosure disclosed in the claims.

According to the present disclosure, the diameter of the entire flow path in the ejector nozzle may be changed depending on the flow rate of the fluid introduced into the ejector nozzle. Therefore, it is possible to provide the structure that satisfies both the low-flow rate region and the high-flow rate region by changing the size of the entire flow path of the ejector nozzle based on the flow rate of the fluid to be supplied.

In addition, the present disclosure may allow the opening/closing member to perform the opening or closing operation, without a separate control means, by using the elastic member that elastically operates based on the pressure in the nozzle which is determined in accordance with the flow rate. Therefore, the present disclosure may reduce costs and implement high efficiency with a compact structure, thereby improving reliability in respect to products and performances.

What is claimed is:

1. An ejector comprising:
    an ejector body comprising:
        a first inlet part into which a supply gas supplied from a hydrogen storage tank is introduced; and
        a second inlet part into which a recirculation gas, which is discharged from a fuel cell stack and recirculates to the fuel cell stack, is introduced; and
    an ejector nozzle provided in the ejector body and configured to eject the supply gas introduced into the first inlet part to circulate the recirculation gas,
    wherein the ejector nozzle comprises:
    a first tube having a first flow path into which the supply gas is introduced; and
    a second tube provided outside the first tube and having an inner diameter larger than an inner diameter of the first tube, the second tube defining a second flow path between the first tube and the second tube,
    wherein the first tube further comprises a communication port that penetrates the first tube to allow the first flow path to communicate with the second flow path and is openably and closably provided, wherein an opening/closing member is provided in the first tube to open or close the communication port and provided to be rotatable in a direction toward the second tube about a portion connected to the first tube by a hinge, wherein an elastic member is arranged between the first tube and the second tube and configured to provide elastic force that allows the opening/closing member to open or close the communication port by elastically deforming based on a flow rate of the fluid introduced into the first flow path, wherein when the communication port is opened, a part of the supply gas flowing in the first flow path is allowed to flow along the second flow path, and wherein one end of the elastic member is fixed to an inner surface of the second tube, and an opposite end of the elastic member is fixed to the opening/closing member in the first tube.

* * * * *